US009055077B2

(12) United States Patent
Lindley et al.

(10) Patent No.: US 9,055,077 B2
(45) Date of Patent: Jun. 9, 2015

(54) DEVICE IDENTITY MATCHING

(75) Inventors: Gregory Charles Lindley, Sunnyvale, CA (US); William Martin Bachman, San Jose, CA (US); Timothy B. Martin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 909 days.

(21) Appl. No.: 12/545,974

(22) Filed: Aug. 24, 2009

(65) Prior Publication Data
US 2011/0047598 A1 Feb. 24, 2011

(51) Int. Cl.
G06F 21/62 (2013.01)
H04L 29/06 (2006.01)
H04W 12/08 (2009.01)

(52) U.S. Cl.
CPC ............ H04L 63/101 (2013.01); H04W 12/08 (2013.01); H04L 63/0876 (2013.01); G06F 21/6245 (2013.01)

(58) Field of Classification Search
CPC .. H04W 12/08; H04W 76/021; H04L 12/585; H04L 63/101; H04L 63/0876
See application file for complete search history.

(56) References Cited

U.S. PATENT DOCUMENTS

| 7,403,512 | B2 | 7/2008 | Tsai et al. | |
|---|---|---|---|---|
| 7,516,201 | B2 | 4/2009 | Kovacs et al. | |
| 7,680,819 | B1 * | 3/2010 | Mellmer et al. | 707/783 |
| 8,103,247 | B2 * | 1/2012 | Ananthanarayanan et al. | 455/411 |
| 2002/0184310 | A1 * | 12/2002 | Traversat et al. | 709/204 |
| 2003/0065851 | A1 * | 4/2003 | Layman | 710/260 |
| 2003/0172294 | A1 * | 9/2003 | Judge | 713/200 |
| 2004/0148269 | A1 * | 7/2004 | Wyllie | 707/1 |
| 2004/0162876 | A1 * | 8/2004 | Kohavi | 709/203 |
| 2006/0117105 | A1 * | 6/2006 | Lesenne et al. | 709/226 |
| 2007/0099568 | A1 | 5/2007 | Yang et al. | |
| 2007/0287420 | A1 * | 12/2007 | Kirke | 455/411 |
| 2008/0109852 | A1 * | 5/2008 | Kretz et al. | 725/62 |
| 2008/0147735 | A1 * | 6/2008 | Sloo | 707/104.1 |
| 2009/0063691 | A1 | 3/2009 | Kalofonos et al. | |
| 2009/0193512 | A1 * | 7/2009 | Buckley et al. | 726/9 |
| 2009/0233548 | A1 * | 9/2009 | Andersson et al. | 455/41.2 |
| 2009/0282050 | A1 * | 11/2009 | Thomas et al. | 707/10 |
| 2010/0261463 | A1 * | 10/2010 | Collet et al. | 455/414.1 |
| 2010/0299758 | A1 * | 11/2010 | Hyun et al. | 726/28 |

FOREIGN PATENT DOCUMENTS

WO 2008/004207 A2 1/2008
WO WO2008/056000 * 5/2008 ............. H04L 12/56

OTHER PUBLICATIONS

Bavor, Clay and Levinson, Jesse, "Wireless Home and Office Appliance Management and Integration", U.S. Appl. No. 11/195,586, filed Aug. 1, 2005.

* cited by examiner

*Primary Examiner* — Jung Kim
*Assistant Examiner* — Robert Leung
(74) *Attorney, Agent, or Firm* — Downey Brand LLP

(57) ABSTRACT

Devices are identified by their owners and authorization to network two or more devices is based on device ownership. Data structures such as address books can store information about an owner of a device and maintain an entry indicating that a particular entry identifies the owner of the device. Other entries in the address book are contacts of the owner. A host device can authorize a client for communication with the host based on a relationship between the owner of the client and the owner of the host as indicated by the presence of the contact information of the client's owner in the host's address book. Devices and can enable communication and sharing of services and levels of access permissions based on the relationship of the owners' of the respective devices.

20 Claims, 6 Drawing Sheets

DEVICE IDENTITY MATCHING

TECHNICAL FIELD

The present technology is related to identifying devices based on their owner, and more specifically related to recognizing commonly owned devices, and devices owned by contacts, to authorize network connections between the devices.

INTRODUCTION

There is a wide variety of electronics and other devices available on the market. Many of these devices attempt to make the lives of their respective owners (or users) easier, more convenient, and more enjoyable. It is common for a device owner to own and use multiple devices. For example, a device owner may use his/her desktop computer at home, laptop computer at work, and smartphone during commute. It is important for one device to be able to share information with other commonly owned devices. For example, a device owner may need to share pictures or documents amongst his/her desktop computer, laptop computer, and smartphone. A device owner may often times rely on more than one of his/her devices in the ordinary course of daily life. As a result, many device owners are becoming more attached to their devices.

With this increasing reliance on electronic devices where devices become a part of users' everyday lives, there is a need for these devices to be more personal. Typically the closest a device comes to being associated with its owner is through an owner account, or an owner identity field, or name of a profile on a device. However, an owner account typically associates a number or a SIM card with an owner on a server computer; the device does not know of the owner's personal identity. The same is true with an owner identity field which has the result of inserting the owner's name or contact information on wallpaper so that the device can be returned when lost, or inserting the owner's name in comment bubbles or forms to be filled out or to name a device on a network, e.g., "Sam's MacBook Pro."

Due to this deficiency, a device cannot identify itself or other devices by their owners absent some additional user steps that associate various accounts as being related. Even then, the nature of the relationship might not be clear. Owners have personal attributes, friends, and preferences. A need exists for devices to learn about the personal attributes, friends and preferences to enable new authentication techniques, and to permit users to switch devices without needing to create new authentication certificates, to identify a friend's devices nearby, to automatically configure devices owned by the same person to work together, and to facilitate other benefits stemming from identifying an owner to a device.

SUMMARY

Additional features and advantages of the concepts disclosed herein are set forth in the description which follows, and in part will be obvious from the description, or may be learned by practice of the described technologies. The features and advantages of the concepts may be realized and obtained by means of the instruments and combinations particularly pointed out in the appended claims. These and other features of the described technologies will become more fully apparent from the following description and appended claims, or may be learned by the practice of the disclosed concepts as set forth herein.

The present disclosure describes methods and arrangements for accepting communications from a second device based on the ownership of the second device. A first device can receive a communication request from a second device. The communication request comprises information identifying the owner of the second device so that the first device can authorize the requested communication based on the ownership of the second device. If the owner of the second device is represented as a contact in an address book stored on the first device, the first device can authorize communication by sending configuration information to the second device to enable the second device to connect to the first device.

In some embodiments the owner of the second device is the owner of the first device. Since both devices are commonly owned, sharing of information about the owner's preferences and characteristics can be desired and this sharing can be accomplished as part of the configuration information or a separate communication.

In some embodiments, the owner of the first device differs from the owner of the second device; thus, the ownership of the two devices is diverse. An owner can have a plurality of contacts, stored as entries in the address book. In some embodiments, access permissions can vary by contact and information about the level of access permissions can be stored along with the contact's information in the address book.

In some embodiments, the host device can offer different services and this information can be communicated via the configuration information or a separate communication. Examples of these services can include sharing of location information, instant messaging, file sharing and other services.

Additionally, a system for authenticating a client device for communication with a host device is disclosed, including at least one client device having a memory configured to store vcards. The vcard can be used to identify an owner of the client device by including contact information for the owner of the client device.

The system further comprises a host device having a memory configured to store vcards. Again, the vcard can identify the owner of the host device. Vcards can also identify contacts of the host device's owner. The host electronic device further comprises a communications interface configured to receive a communications request from the client device, and a processor configured to correlate the owner of the client device with the owner or contact identified by one of the vcards stored in the memory of the host device. Upon a positive correlation the processor can be further configured to authorize communications with the client device.

A computer readable medium storing computer executable instructions for implementing a method on a device is also disclosed. The computer readable medium comprises computer code for instructing a device to receive data comprising information identifying a owner of the device and detect the presence of a second device on a network having the same owner, and establish trusted communications with the second device based on the common ownership of the two devices. In some embodiments a service discovery protocol is used to detect the presence of the second device on the network.

Also contemplated is a device comprising a memory configured for storing an address book having information associated with contacts that includes a flag identifying one of the contacts as the owner of the device. The device further comprises a network interface configured for receiving information about other devices on a network and a processor configured for running a service discovery protocol controlling the network interface to receive information about services offered by and ownership of other devices on the network. The device is further configured for initiating a connection between the devices, and for accepting a connection request with one of the other devices on the network based on a positive correlation of the ownership of the other device and the entries in the address book.

Additionally, a method of initiating communications with a host device is disclosed. A client device can send a communication request to a host device. The communication request can optionally be sent after the client device recognizes the host device having a recognized owner as broadcast by a service discovery protocol. The communication request comprising information identifying the owner of the client device as a contact of the host device. The client device can receive configuration information from the host device if the host device recognizes the owner of the client device as a contact of the owner of the host device and configuring the client device to operate in accordance with the received configuration information.

BRIEF DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

DETAILED DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 1:
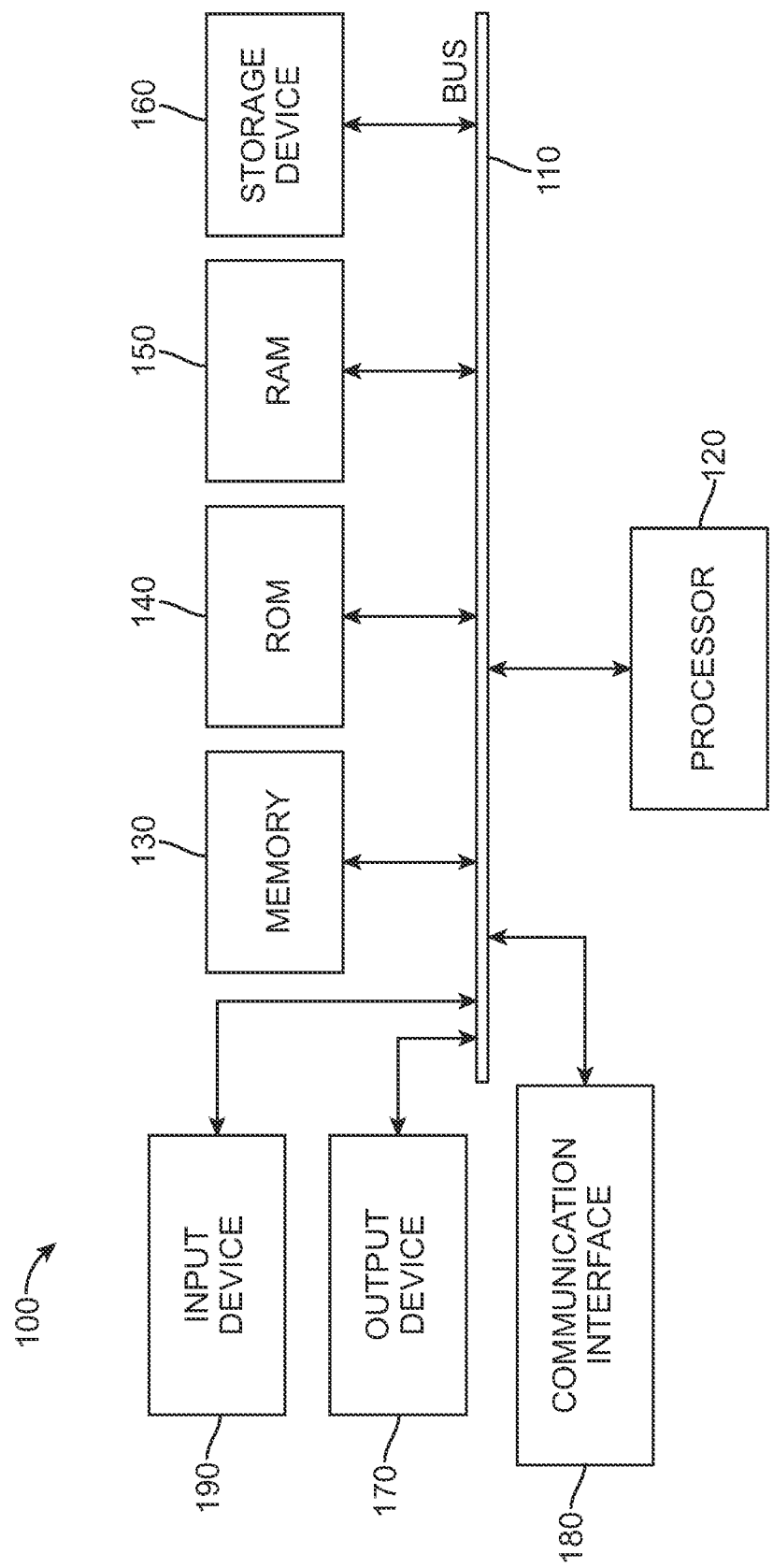
FIG. 1 illustrates an example computing device.

With reference to FIG. 1, a general-purpose computing device 100 which can be portable or stationary is shown, including a processing unit (CPU) 120 and a system bus 110 that couples various system components including the system memory such as read only memory (ROM) 140 and random access memory (RAM) 150 to the CPU 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a storage device 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a large computer server.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. For example, video output or audio output devices which can be connected to or can include displays or speakers are common. Additionally, the video output and audio output devices can also include specialized processors for enhanced performance of these specialized functions. In some instances, multimodal systems enable a user to provide multiple types of input to communicate with the computing device 100. The communications interface 180 generally governs and manages the user input and system output. There is no restriction on the disclosed methods and devices operating on any particular hardware arrangement and therefore the basic features may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI), field-programmable gate array (FPGA), and application specific integrated circuit (ASIC) hardware embodiments may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
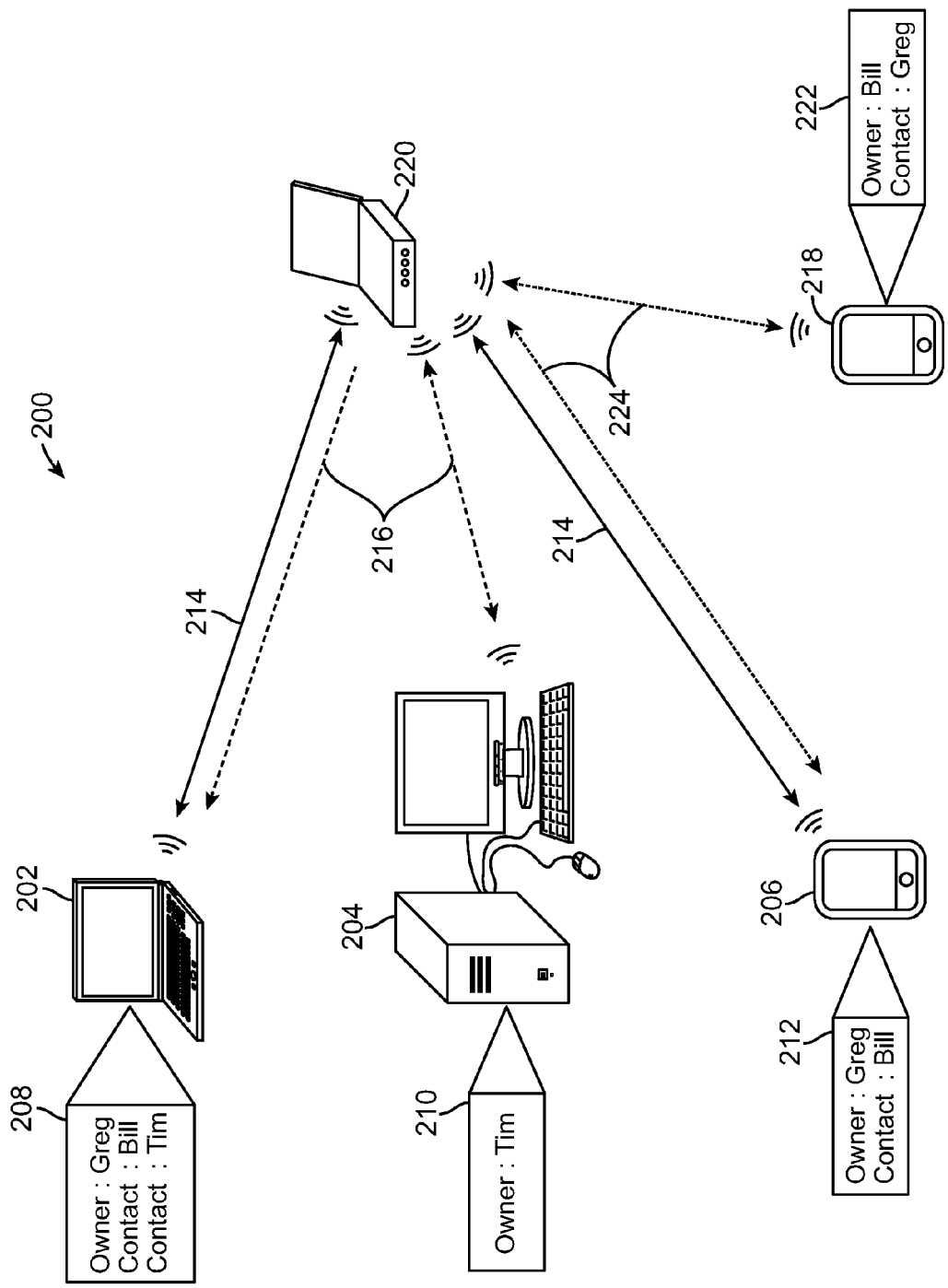
FIG. 2 illustrates an example system embodiment.

The present system and method is particularly useful for associating devices with the identities of their owners. System 200 is illustrated in FIG. 2 wherein a plurality of devices is present on a network, each communicating with other devices on the network. In some embodiments, the present system and method are carried out on a local area network such as that illustrated in FIG. 2, however, the present principles are applicable to a wide variety of networks that facilitate the intercommunication of electronic devices.

Each networked device 202, 204, 206, 218 can have an address book 208, 210, 212, 222, respectively, or other data structure for maintaining information about their personal contacts on a disk. Laptop 202 has an address book 208 that maintains at least contact information about the owner (Greg) of laptop 202 and the contacts of the owner (Bill and Tim). Likewise, personal computer 204 has an address book 210 that only identifies its owner (Tim). Portable multimedia playing device, IPOD TOUCH (Apple Inc. of Cupertino, Calif.) 206 maintains address book 212 that also identifies its owner (Greg) and a contact (Bill). Smartphone, IPHONE (Apple Inc. of Cupertino, Calif.) 218 maintains address book 222 listing its owner (Bill) and a contact (Greg).

Based on these address book entries the devices 202, 204, 206, 218 can identify other commonly-owned devices and authorize these devices for networked communication. For example devices 202 and 206 are both commonly owned (by Greg). Communicating 214 over the wireless network provided by router 220, these devices can identify that they are commonly owned and can trust each other for networked communication. As illustrated both of these devices can authorize the other for networked communication with them.

Similarly devices 202, 204, 206, 218 can also authorize and initiate communications with diversely-owned devices. For example, if the first device, acting as a host, receives a connection request from a second device, acting as a client, the host device can authorize communication with the client device if it is owned by a person listed as a contact on the host device. Described with respect to FIG. 2, device 202 can authorize device 204 (owned by Tim) to communicate 216 with it because the owner of device 204 is listed as a contact on device 202 (Tim is Greg's contact). Similarly, device 206 can authorize communication with device 218 and device 218 can authorize communication 224 with device 206, because the owner of device 218 (Bill) is listed as a contact on device 206 and the owner of device 206 (Greg) is found as a contact on device 218.

Figure 3:
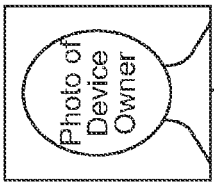
FIG. 3 illustrates a sample address book and associated vcard.

The address book can be a modified version of conventional electronic address books or can be any other data structure that can store an owner's contact information and/or personal attributes and identify the owner as the owner of the device in a way that is meaningful to the device. FIG. 3 illustrates an embodiment of an address book 230 and a vcard 225 for an entry designating the device owner. As illustrated vcard 225 contains fields for storing a variety of information such as a photo 232, name 233, full name 234, organization 235, title 236, work telephone 237, home telephone 238, work address 239, label for work address 240, home address 241, label for home address 242, email 243, last revision for the v-card 244, nickname 245, spouse name 246, child name 247, favorite food 248, favorite book 249, favorite movie 250, and favorite song 251. The exemplary vcard is merely for illustrative purposes only and should not be considered to specify or limit the exact data contained therein.

As mentioned above, a mechanism for identifying the person described in the vcard as the owner of the electronic device is required. In one embodiment, illustrated in FIG. 3 the vcard contains a field 260 for identifying the person described by this vcard as the owner. In some embodiments the owner can be identified in other ways such as by selecting the owner from a list of contacts according to a prompt or menu thereby setting a flag or other designation.

Figure 4:
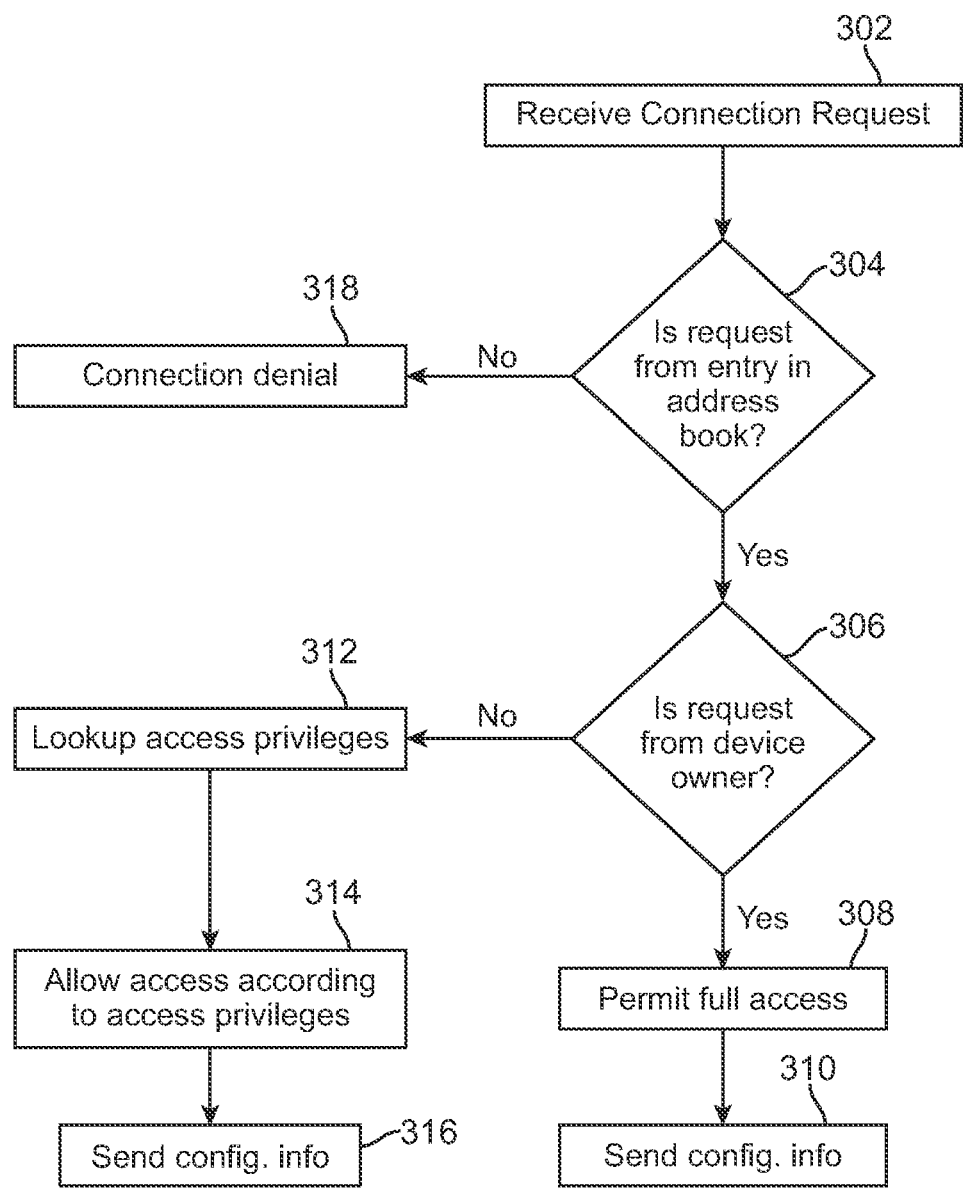
FIG. 4 illustrates a method embodiment for accepting or rejecting a connection request.

By informing a device about the identity of its owner, the device can use this information to authorize communications with other devices, and even to properly configure itself to work with commonly owned or contact owned devices. A device can use its address book information, including information about its owner to connect to another device or allow a device to connect with it. One method embodiment for establishing such a connection is shown in FIG. 4.

A first device, acting as a host, can receive a connection request (302) from another device, acting as a client, and the host can determine if the client is owned by a person represented by an entry in the host's address book (304). If the owner of the client does not appear in the host's address book, the connection is denied (318). If the owner of the client appears in the host's address book, the host next determines if the client is commonly owned (306).

If both devices are commonly owned, in some embodiments, the client can be permitted full access permissions to the host (308) and the host will send configuration information to the client (310) to initiate a connection. In these embodiments, the client is presumed to have full access rights because the same person owns both devices and the same level of access as the owner would have when interacting with the device directly should be afforded to the person when interacting remotely.

However, in some embodiments it can be useful to restrict even an owner's remote access. In these embodiments, a particular level of access can be specified and associated with the vcard or other data structure representing the owner.

Returning to 306, if the result of the query is that the owner of the client is not also the owner of the host device then the appropriate level of access can be determined (312) for the client device based on the identity of its owner and the host can determine that access is to be granted (314). At 316, the host can send configuration information appropriate for the specified level of access to the client.

The configuration information in both the co-owned embodiments and diverse owner embodiments preferably contains at least all necessary configuration information to interact with the host device. For example, if the host device is running programs or services that the client device can interact with, information about these programs or services preferably are included as part of the configuration information. Therefore, configuration information will include more than just connection information and can additionally include information such as the identities of programs and services, whether any applications are required to interact with the programs and services, and how to automatically acquire those applications.

Figure 5:
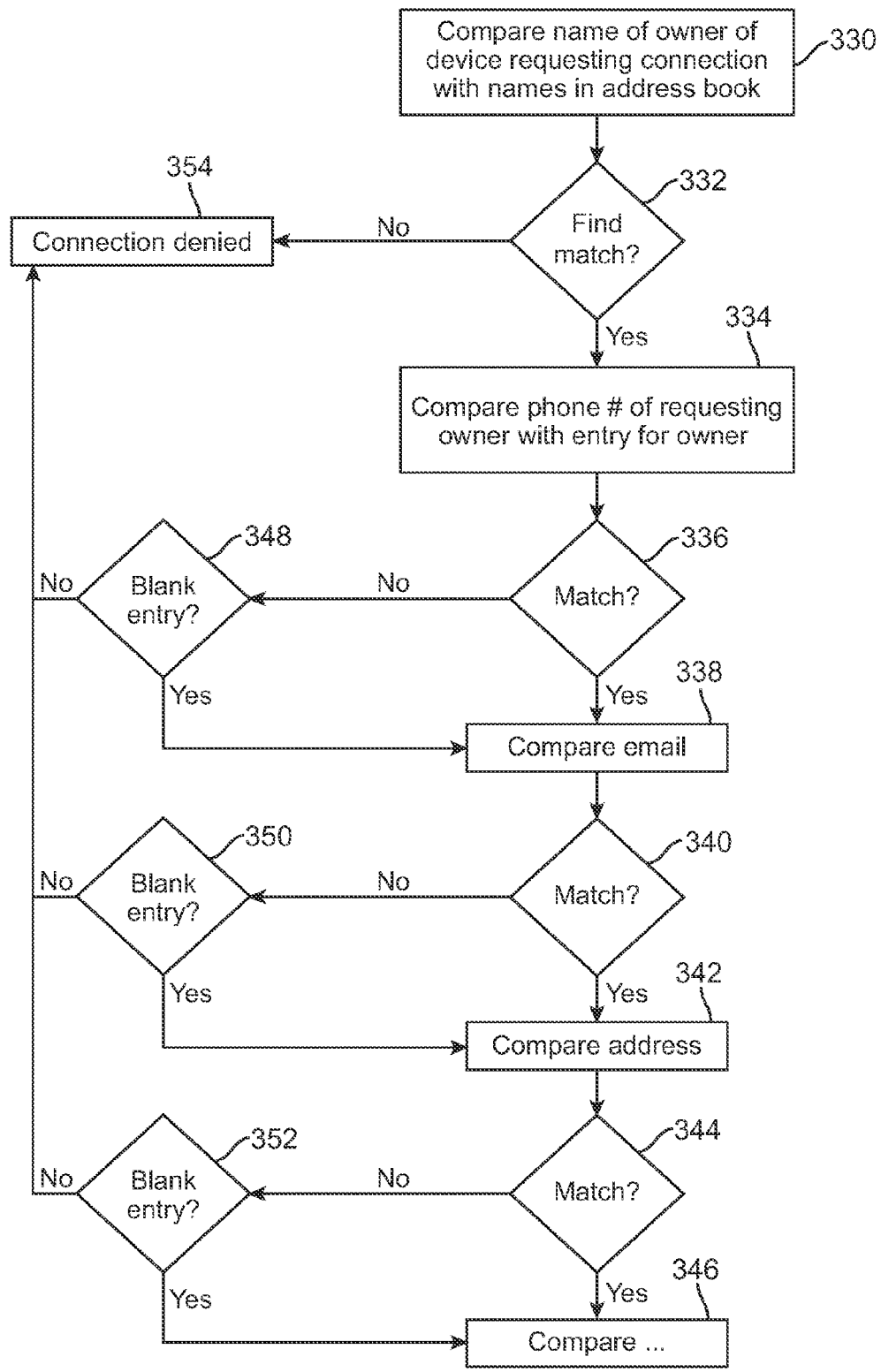
FIG. 5 illustrates a method embodiment for authenticating a user.

Security and authentication are also important considerations and FIG. 5 illustrates one method of confirming that the connecting device is actually owned by the person represented in the host's address book. The method illustrated in FIG. 5 requires a match between more than just a name field since people can have the same name. Additionally, if only a name were required, possibilities for fraudulent representation would be too great. Therefore, the embodiment illustrated in FIG. 5 can be modified to require a specified number of fields in the vcards of the respective devices to match. For each additional field that is required to match, the likelihood that the owner represented by the connecting device is the true owner is augmented.

At 330 the name of the owner of the connecting device is compared with names in the address book of the host device. If a match is found (332) the phone number of the owner of the connecting device can be compared to the phone number associated with that person on the host device. If a match is found (336), email addresses are compared at 338. If there is a match at 340 physical addresses can be compared at 342. At this point, if all of this information matches 344, there is a good likelihood that the person represented as owning the connecting device is genuine. However, as indicated by 346, the process can continue to compare any fields that are listed in the vcard.

348, 350, 352 each determine whether the reason that a match was not found (336, 340, 344) was because the host device or the connecting device did not have any data for that field or if the data in the fields did not correlate. If the failure to find a match at 336, 340, 344 is because of a mismatch in data determined in at 348, 350, 352 then the connection can be denied at 354. If the field to be matched was empty, then the method can proceed to the next field.

In some embodiments, mismatches can be accommodated and still allow a potential connection. For example, the host device can require that a certain number of fields match and as long as the number is achieved it will allow the connection. The host device can also weight different fields more heavily. For example the telephone number field can be weighted more than the email address field. A further variation could allow each field a score, if a certain total score of matches is achieved the identity of the owner of the connecting device can be deemed confirmed and a connection allowed to be created.

In some embodiments, a client device wishing to connect to a potential host device might desire to connect anonymously. In such embodiments the client device can send an anonymous key, code or certificate which the host device can recognize and match the identity of the client sending the anonymous key, code or certificate with the owner of the client device. In such a way, the client device can send a communication to a host device devoid of any personal information, but the host device, having a record of keys, codes, and certificates associated with potential clients can still identify the requesting device by its owner. Authentication by these embodiments can provide additional security to the owner of the client by avoiding the need to send personal identifying information over a potentially unsecure connection.

While authentication techniques have been illustrated and discussed above, variations to these methods are contemplated. The number of fields to be matched, the order in which the fields are compared, the selection of fields to be compared, can all be varied. Further, other authentication techniques can also be utilized. For example, users can have a digital certificate associated with their vcard or identity. In such instances, the owner of the vcard can share the vcard with each of their contacts and only connecting devices presenting that certificate can be authenticated. Many other potential authentication techniques can be employed to ensure proper security and are known in the art.

The fundamental concept of associating devices with their owners provides efficiencies for both users and devices a like. Users can identify and connect to other devices on their networks in a simple conceptual manner, just like selecting a contact for sending an email. Further, user names or passwords are not needed, since the comparison of data that is associated with the user (phone number, email address, etc.) serves to authenticate the user. A further efficiency is that devices owned by the same owner can crosstalk and configure each other for seamless interaction. This will be described in greater detail below.

Devices also achieve efficiencies. Using this system and method, a processor does not need to generate and display prompts for the user to provide authentication information. Additionally, in some embodiments, users don't need to instruct the device to connect to the other devices on the network, eliminating these steps.

Further efficiencies will additionally become apparent from the following discussion addressing exemplary embodiments for the use of the system and method described above.

Figure 6:
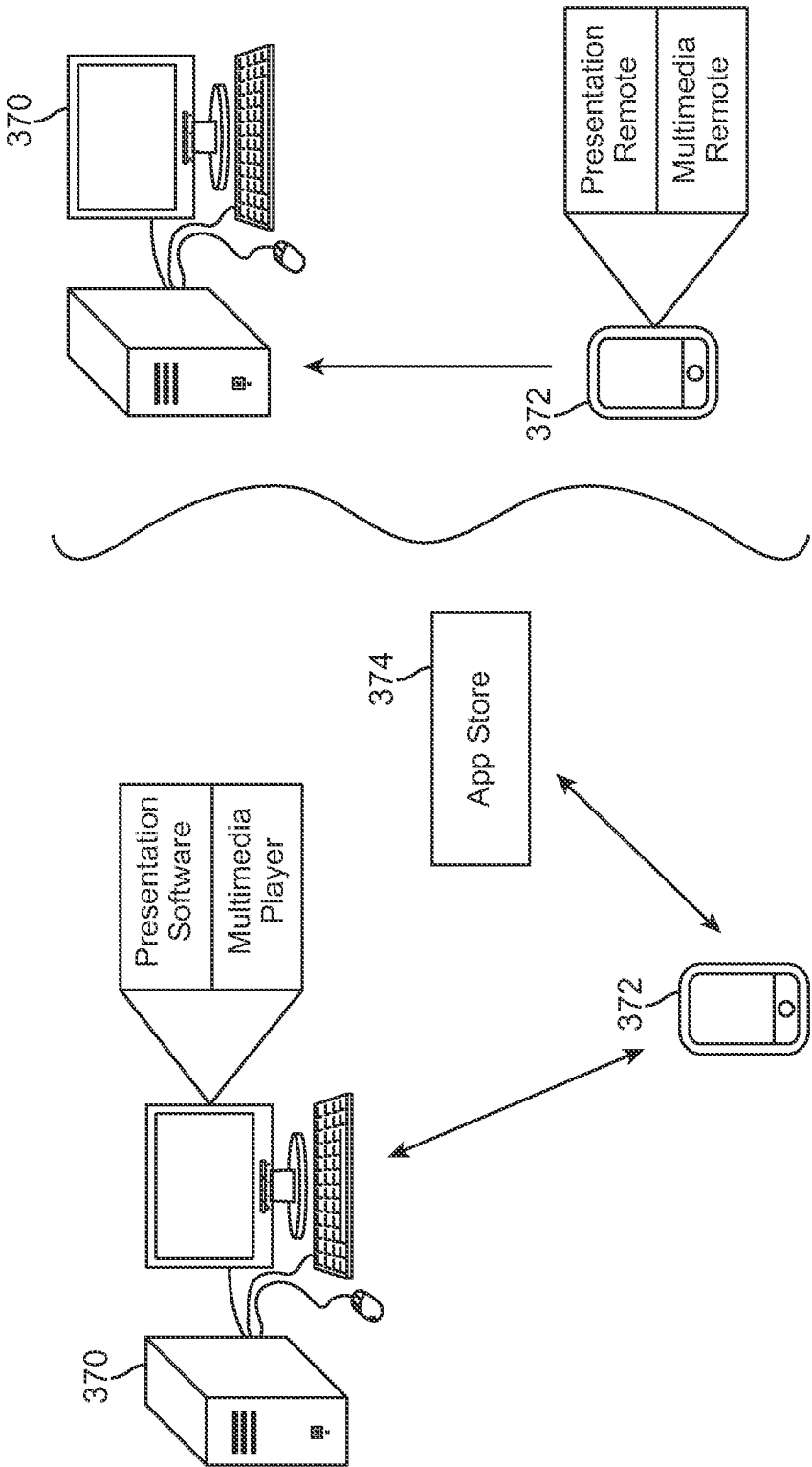
FIG. 6 illustrates a configuring a client device for interacting with a service offered by a host device.

One way in which identifying devices by their owners can be useful is to keep all commonly owned devices configured to work with each other. As illustrated in FIG. 6, a personal computer 370 might have presentation software, or multimedia-playing software installed thereon. A commonly owned smartphone 372 can connect to the personal computer, learn of the presentation software and multimedia software and download remote control applications from an app store 374 and install applications useful in remotely controlling these programs.

In another embodiment commonly owned devices can communicate data regarding their owner's preferences. Devices can record user preferences in the vcard or data structure associated with the owner and share these preferences with other devices that are commonly owned. Internet bookmarks, home pages, operating system language preferences, are all examples of preferences that can be learned by one or more devices and shared with other commonly owned devices. Additionally, devices can learn that they are a preferred device for listening to music or playing movies or working with documents. By sharing this information with other commonly owned devices, the devices can automatically transfer files to the preferred devices automatically.

Personal characteristics can also be learned by one or more devices and shared with other commonly owned devices. For example, through calendar entries or interaction with social networking sites, one device might learn the owner's birthday and the birthday of the owner's friends and share this information.

In some embodiments when a device having common ownership with a host is detected on a network, the host can take various actions. For example, if the host is a work computer and it detects the presence of a commonly owned mobile device on the network, the host computer can wake up, download emails and be ready for direct interaction with the owner when the owner makes her way through the building to her office. Likewise a home computer can detect the presence of a commonly owned mobile device and control functions of the home such as the lights or climate control or even door locks as a convenience to the owner.

Each of the embodiments above can apply to situations where the two devices have a diverse ownership too, but some embodiments make more sense for commonly owned devices. Examples of some embodiments that are contemplated for use in common and diverse ownership scenarios include file sharing and configuring a connecting device to take advantage of services offered by the host device.

A file-sharing embodiment can be based on levels of permissions just as some conventional file-sharing systems. The level of permission, and the type of files shared can be stored within the vcard associated with a contact. If the devices sharing files are commonly owned, additional features are contemplated. For example, files that are accessed most often can be automatically copied to all devices so that they are always available.

Diversely owned devices can also be configured to take advantage of services offered by a host device. For example if one device is hosting a multi-player game, a contact's device can configure itself to be able to join the game by downloading and installing a required application. If the application requires payment for use, the device could install the application and wait for the owner's permission to activate the program. In another similar example, a host device can be hosting a collaborative music playlist such as ITUNES DJ (Apple Inc., Cupertino, Calif.), which requires a client device to download a remote application. The client device can pre-configure itself to be ready to participate in the collaborating community.

In embodiments such as that described above, temporary communities of diversely owned devices can be formed. Using a collaborative music playlist or multi-player game to illustrate an example, a plurality of clients can connect to a host that is hosting the collaborative music playlist or game and participate in the shared service creating a temporary community for the purpose of participating in the shared service. In these embodiments, if a host device were to leave the temporary community, another device could assume the host responsibilities and the community can continue even after the original host has left the community.

Other implementations according to these examples include computer-readable media for carrying or having computer-executable instructions or data structures stored thereon. Such computer-readable media can be any available media that can be accessed by a general purpose or special purpose computer. By way of example, and not limitation, such tangible computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed as limiting. Those skilled in the art may recognize various modifications and changes that may be made while following the example embodiments and applications illustrated and described herein, and without departing from the true spirit and scope of the present disclosure.

We claim:

1. A machine-readable non-transitory storage medium storing instructions that, when executed by a processor included in a computing device belonging to a user, cause the computing device to carry out steps that include:
   storing a data file and a contact list;
   receiving a request to establish a network connection with a client device, wherein the request includes client contact data and a request to participate in a shared service associated with the data file;
   comparing the client contact data to the contact list by generating a weighted score for a number of matching fields between the contact list and the client contact data;
   determining a common ownership between the client device and the computing device when the weighted score reaches or exceeds a threshold;
   sending configuration information to the client device, the configuration information corresponding to both: i) connection information and, ii) a program executing at the computing device and associated with the data file;
   causing the client device to download and install a remote application, according to the configuration information, for interfacing with the program executing at the computing device; and
   causing the client device to remotely interface with the program and the data file.

2. The machine-readable non-transitory storage medium of claim 1, wherein the client contact data includes a phone number corresponding to the computing device.

3. The machine-readable non-transitory storage medium of claim 1, wherein the configuration information includes a specified level of access to govern the client device.

4. The machine-readable non-transitory storage medium of claim 1, wherein the configuration information includes identities of programs available at the computing device.

5. The machine-readable non-transitory storage medium of claim 1, wherein the contact list is an address book having one or more names of contacts associated with the user.

6. The machine-readable non-transitory storage medium of claim 1, wherein the configuration information includes location information.

7. The machine-readable non-transitory storage medium of claim 1, wherein the configuration information includes information for establishing instant messaging communications between the client device and the computing device.

8. A computing device, comprising:
a processor; and
a memory storing a contact list, a data file, and instructions that when executed by the processor cause the computing device to perform steps that include:
receiving a request to establish a network connection with a client device, wherein the request includes client contact data and a request to participate in a shared service associated with the data file;
comparing the client contact data to the contact list by generating a weighted score for a number of matching fields between the contact list and the client contact data;
determining a common ownership between the client device and the computing device when the weighted score reaches or exceeds a threshold;
sending configuration information to the client device, the configuration information corresponding to both: i) connection information and, ii) a program executing at the computing device and associated with the data file;
causing the client device to download and install a remote application, according to the configuration information, for interfacing with the program executing at the computing device; and
causing the client device to remotely interface with the program and the data file using the remote application.

9. The computing device of claim 8, wherein the client contact data includes a phone number corresponding to the computing device.

10. A machine-readable non-transitory storage medium storing instructions that, when executed by a processor included in a computing device belonging to a user, cause the computing device to carry out steps that include:
storing a data file and a contact list;
receiving a request to establish a network connection with a client device, wherein the request includes (i) an invitation to participate in a shared service associated with the data file, and (ii) at least one contact that does not correspond to the user;
determining that the client device also belongs to the user by verifying that the at least one contact is included in the contact list;
sending configuration information to the client device, the configuration information corresponding to both: i) connection information and, ii) a program executing at the client device and associated with the data file;
causing the client device to download and install a remote application, according to the configuration information, for interfacing with the program executing at the computing device; and
causing, by way of the remote application, the client device to interface with the data file.

11. The machine-readable non-transitory storage medium of claim 10, wherein the contact list is an address book having one or more names of contacts associated with the user.

12. The machine-readable non-transitory storage medium of claim 10, wherein the configuration information includes a specified level of access that governs the computing device.

13. The machine-readable non-transitory storage medium of claim 10, wherein the configuration information includes identities of programs available at the client device.

14. The machine-readable non-transitory storage medium of claim 10, wherein the at least one contact includes a contact phone number that does not correspond to a phone number for the computing device.

15. A computing device, comprising:
a processor; and
a memory configured to store a contact list, a data file, and instructions that when executed by the processor cause the computing device to perform steps that include:
receiving a request to establish a network connection with a client device, wherein the request includes (i) an invitation to participate in a shared service associated with the data file, and (ii) at least one contact that does not correspond to a user of the computing device;
determining a common ownership between the computing device and the client device by verifying that the at least one contact is included in the contact list;
sending configuration information from the client device, the configuration information corresponding to both: i) connection information and, ii) a program executing at the computing device and associated with the data file;
causing the client device to download and install a remote application, according to the configuration information, for interfacing with the program executing at the computing device; and
causing, by way of the remote application, the client device to interface with the data file.

16. A method for remotely interfacing with a data file, the method comprising:
at a computing device belonging to a user:
storing a contact list and the data file;
receiving a request to establish a network connection with a client device, wherein the request includes client contact data;
comparing the client contact data to the contact list by generating a weighted score for a number of matching fields between the contact list and the client contact data;
determining a common ownership between the client device and the computing device when the weighted score reaches or exceeds a threshold;
receiving configuration information from the client device, the configuration information corresponding to both: i) connection information and, ii) a program executing at the client device and associated with the data file;
causing the client device to download and install a remote application, according to the configuration information, for interfacing with the program executing at the computing device; and
causing the client device to remotely interface with the program and the data file by way of the remote application.

17. The method of claim 16, wherein the contact list is an address book having one or more names of contacts associated with the user.

18. The method of claim 16, wherein the client contact data includes a phone number corresponding to the computing device.

19. The machine-readable non-transitory storage medium of claim 1, wherein the threshold is configured such that at least one field of the client contact data and the contact list match.

20. The machine-readable non-transitory storage medium of claim 1, further comprising:
determining that the client device is a preferred device for executing certain types of data files and automatically transferring to the client device one or more of the certain types of data files.

* * * * *